(12) United States Patent
Feng et al.

(10) Patent No.: US 10,055,625 B2
(45) Date of Patent: Aug. 21, 2018

(54) IMAGING BARCODE READER WITH COLOR-SEPARATED AIMER AND ILLUMINATOR

(71) Applicant: Hand Held Products, Inc., Fort Mill, SC (US)

(72) Inventors: Chen Feng, Snohomish, WA (US); Jie Ren, Jiangsu (CN)

(73) Assignee: Hand Held Products, Inc., Fort Mill, SC (US)

(*) Notice: Subject to any disclaimer, the term of this patent is extended or adjusted under 35 U.S.C. 154(b) by 0 days.

(21) Appl. No.: 15/470,971

(22) Filed: Mar. 28, 2017

(65) Prior Publication Data

US 2017/0300728 A1    Oct. 19, 2017

(30) Foreign Application Priority Data

Apr. 15, 2016  (CN) .......................... 2016 1 0233259
Apr. 15, 2016  (CN) ..................... 2016 2 0314790 U

(51) Int. Cl.
  *G06K 7/10*   (2006.01)
  *G06K 7/14*   (2006.01)
  *G06K 19/06*  (2006.01)

(52) U.S. Cl.
  CPC ...... *G06K 7/10732* (2013.01); *G06K 7/10811* (2013.01); *G06K 7/10881* (2013.01); *G06K 7/1417* (2013.01); *G06K 19/06037* (2013.01)

(58) Field of Classification Search
  CPC .. G06K 7/10; G06K 9/36; G06K 9/80; G06K 15/12; G06K 5/00; G06K 7/14; G03B 7/08; G06F 17/00

(Continued)

(56) References Cited

U.S. PATENT DOCUMENTS 6,832,725 B2   12/2004  Gardiner et al.
7,128,266 B2   10/2006  Zhu et al.
(Continued)

FOREIGN PATENT DOCUMENTS

WO   2013163789 A1   11/2013
WO   2013173985 A1   11/2013
(Continued)

OTHER PUBLICATIONS

U.S. Appl. No. 14/715,916 for Evaluating Image Values filed May 19, 2015 (Ackley); 60 pages.
(Continued)

*Primary Examiner* — Edwyn Labaze
(74) *Attorney, Agent, or Firm* — Additon, Higgins & Pendleton, P.A.

(57) ABSTRACT

A scanner for machine-readable symbols, such as barcodes and two-dimensional matrix symbols, employs at least two different light frequencies (colors). The first frequency supports accurate aiming of the scanner at a symbol. The second frequency supports illumination of a machine-readable symbol so that the reflected illumination light can be read at the second frequency by the scanner's optical imaging element. Employing two different light frequencies enables both aiming and scanning to occur simultaneously, while the aiming process does not interfere with the scanning process. It enables the aiming frequency to be used for additional purposes, such as providing signaling to a user of the scanner. In an embodiment, two distinct light sources are used in the scanner to provide the different light frequencies. In an embodiment, various color filters are employed to separate and distinguish light frequencies. In an embodiment, signal processing may be employed to digitally distinguish multiple separate frequencies in light reflected from the symbol.

20 Claims, 7 Drawing Sheets

(58) Field of Classification Search
USPC ....... 235/462.11, 462.1, 462.24, 462.41, 375
See application file for complete search history.

(56) References Cited

U.S. PATENT DOCUMENTS

| | | | |
|---|---|---|---|
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |

(56) References Cited

U.S. PATENT DOCUMENTS

| | | |
|---|---|---|
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 2003/0034394 A1 | 2/2003 | Gannon et al. |
| 2005/0167507 A1 | 8/2005 | Swartz et al. |
| 2005/0218231 A1 | 10/2005 | Massieu |
| 2007/0063048 A1 | 3/2007 | Havens et al. |
| 2007/0108283 A1* | 5/2007 | Thuries .............. G06K 7/10851 235/454 |
| 2007/0272841 A1* | 11/2007 | Wiklof .................. G01S 7/4817 250/234 |
| 2009/0134221 A1 | 5/2009 | Zhu et al. |
| 2009/0168117 A1 | 7/2009 | Kearney |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0006895 A1 | 1/2012 | Vinogradov et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |

(56) References Cited

U.S. PATENT DOCUMENTS

| | | |
|---|---|---|
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |

(56) References Cited

U.S. PATENT DOCUMENTS

2016/0314276 A1 10/2016 Sewell et al.
2016/0314294 A1 10/2016 Kubler et al.

FOREIGN PATENT DOCUMENTS

WO 2014019130 A1 2/2014
WO 2014110495 A1 7/2014

OTHER PUBLICATIONS

U.S. Appl. No. 29/525,068 for Tablet Computer with Removeable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesh et al.); 35 pages.
U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch Fora Mobile Electronic Device filed Jun. 16, 2015 (Bamdringa); 38 pages.
U.S. Appl. No. 14/740,373 for Calibrating a Volume Dimensioner filed Jun. 16, 2015 (Ackley et al.); 63 pages.
Chinese First Notice of Amendment in Parent CN Application No. 201620314790.5, dated Jul. 29, 2016, 5 pages, English Computer Translation included.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
Extended Search Report in related European Application No. 17163708.5 dated Sep. 13, 2017, pp. 1-7 [U.S. Publication Nos. 2015/0254485 and 2015/0053769 previously cited.].

\* cited by examiner

IMAGING BARCODE READER WITH COLOR-SEPARATED AIMER AND ILLUMINATOR

CROSS-REFERENCE TO RELATED APPLICATIONS

The present application claims the benefit of Chinese Patent Application for Invention No. 201610233259.X for an Imaging Barcode Reader with Color-Separated Aimer and Illuminator filed Apr. 15, 2016 at the State Intellectual Property Office of the People's Republic of China. The present application also claims the benefit of Chinese Patent Application for Utility Model No. 201620314790.5 for an Imaging Barcode Reader with Color-Separated Aimer and Illuminator filed Apr. 15, 2016 at the State Intellectual Property Office of the People's Republic of China. Each of the foregoing patent applications is hereby incorporated by reference in its entirety.

FIELD OF THE INVENTION

The present invention relates to a method and apparatus for decoding machine-readable symbols, and more particularly, to a method and apparatus for aiming a symbol reader and illuminating the machine-readable symbol.

BACKGROUND

Machine-readable symbols (MRSs) provide a means for encoding information in a compact printed form (or embossed form) which can be scanned and then interpreted by an optical-based symbol detector. Such machine-readable symbols are often attached to (or impressed upon) product packaging, food products, general consumer items, machine parts, equipment, and other manufactured items for purposes of machine-based identification and tracking.

One exemplary type of machine-readable symbol is a bar code that employs a series of bars and white spaces vertically oriented along a single row. Groups of bars and spaces correspond to a codeword. The codeword is associated with an alpha-numeric symbol, one or more numeric digits, or other symbol functionality.

To facilitate encoding of greater amounts of information into a single machine-readable symbol, two-dimensional (2D) bar codes have been devised. These are also commonly referred to as stacked, matrix and/or area bar codes. 2D matrix symbologies employ arrangements of regular polygon-shaped cells (also called elements or modules), typically squares. The specific arrangement of the cells in 2D matrix symbologies represents data characters and/or symbology functions.

In this document the terms "barcode" and "symbol" are employed interchangeably, both generally referring to machine-readable symbols, whether linear or two-dimensional.

Symbol readers (or barcode readers), also referred to as scanners, are employed to read the matrix symbols using a variety of optical scanning electronics and methods. In order to properly scan a symbol, the symbol must be within a field of view of a reader. Some readers are hand-held, and can be aimed at a symbol; other readers are fixed in location, and a symbol (and the object to which the symbol is attached) must be placed within a field of view of the reader.

Either way, a symbol scanner may project an "aimer pattern" or "aimer beam"—a pattern of light—which may indicate the scanner's center of the field-of-view; the aimer pattern may also project/include corner patterns to indicate the edges of the field of view. Proper alignment or overlap of the projected aimer pattern with the target symbol indicates that the scanner is properly aimed for scanning.

Once the scanner and symbol are properly aligned to have the symbol in the field of view of the scanner, the scanner proceeds with image capture via an imaging element. The aimer beam typically must be turned off when the imaging element captures a symbol image, because the aimer pattern is visible to the imager and becomes noise superimposed on the symbol. Existing aimers, even if centered on a specific color (red, amber, green), all have high intensity in wavelengths to which the image sensors are sensitive. As a result, aimer illumination of a symbol is easily captured, which can disrupt symbol interpretation. In other words, the imager cannot reliably capture the symbol's image when aimer is on. This is true for most commonly used image sensors with electronic rolling shutters. Consequently, the time spent with the aimer being "on" (illuminating the symbol) directly reduces the imager barcode reader response speed.

In the alternative, for global shutter image sensors, reduced response speed may be less of a problem, as the aimer can be on during the shutter-closed portion of the whole image capture cycle. But for the global shutter image sensors, the short on-period aimer also becomes less visible because of the limitation of the aimer light source output power. An on-and-off aimer also introduces a flashing pattern which induces eye fatigue in users.

One approach to resolving this problem is to use a constant-on aimer with less contribution to the overall image illumination; for example the aimer pattern may be thin or have dotted line patterns. However, for 2D symbols with high density, poor print quality, or with 2D codes with lower redundancy rates, this trade-off will introduce poor decode rate.

Therefore, there exists a need for a system and method for both aimer illumination and symbol capture illumination which avoids time-sharing between the aiming process and symbol capture, yet still achieves a high level of accurate performance in symbol decoding.

SUMMARY

Accordingly, in one aspect, the present invention uses different colors of light, that is, different frequencies or different frequency bands, to bandwidth-separate the aimer patterns from the image capture illumination. This enables the symbol scanner to capture the symbol image even while the aimer-light is always on. In one embodiment, the color separation may be achieved by adding a color blocking filter to block the aimer pattern from reaching the image sensor. The image sensor then becomes effectively color-blind to the aimer color. The image captured with such device is aimer pattern free.

Alternatively, the color separation can be also implemented via software image processing with commonly used color image sensors, without the need of color blocking filter. However, software color-image filtering may result in some degradation to the image quality; may reduce decode performance; may introduce longer decode time; or may necessitate increased processor cost.

Some of the advantages of a color separated aimer, may include:

The aimer pattern can be full frame, indicating complete frame of the field-of-view (FOV), center mark, as well as a near center best decode zone;

the aimer pattern can also include some indicating marks, such as decode status (for example, ready to trigger, busy in decoding, success decode or failure decode);

the aimer pattern can also possibly indicate decode condition, such as too far or too close for decoding.

DETAILED DESCRIPTION

Figure 1:
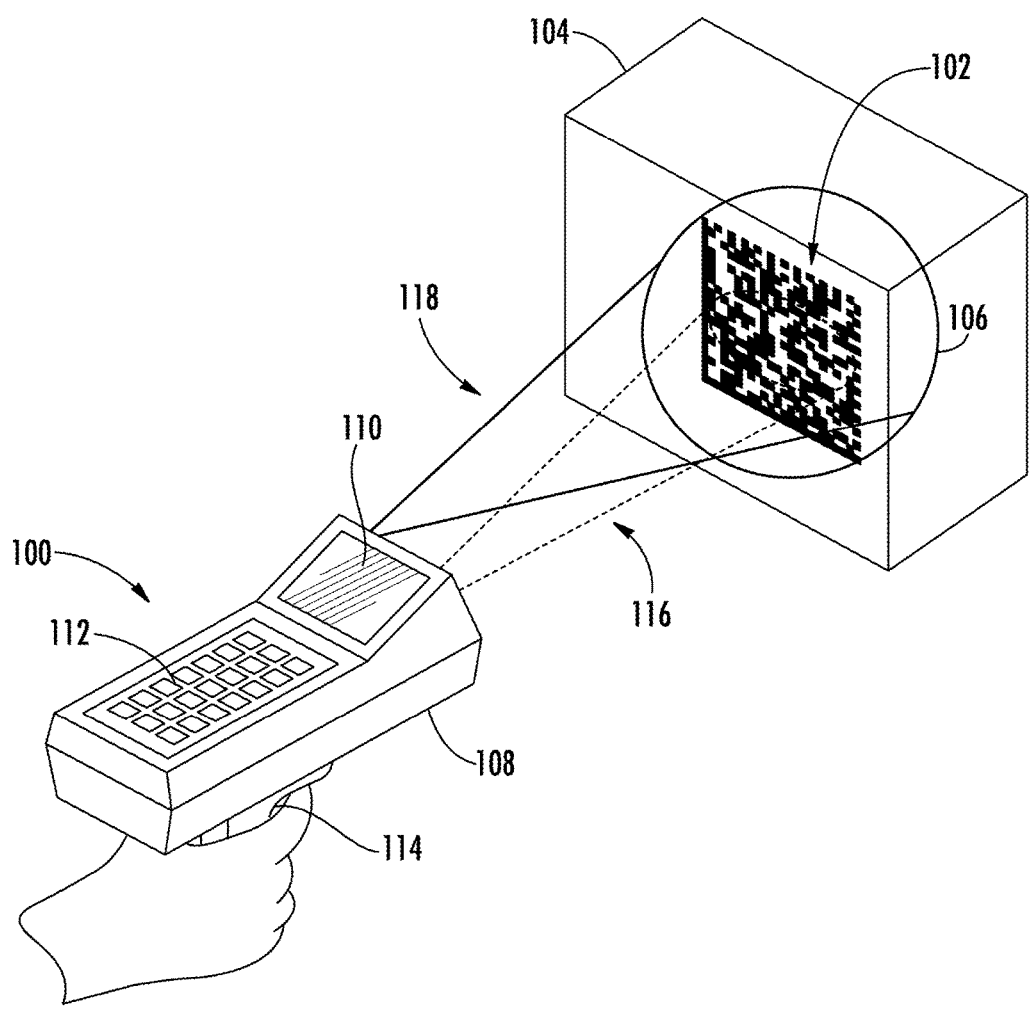
FIG. 1 is a perspective view of an exemplary hand-held symbol reader acquiring data from a machine-readable symbol.

In the following description, certain specific details are set forth in order to provide a thorough understanding of various embodiments. However, one skilled in the art will understand that the invention may be practiced without these details. In other instances, well-known structures associated with imagers, scanners, and/or other devices operable to read machine-readable symbols have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Color, Frequency, and Frequency Bands

Throughout the discussion below, it will be understood that a reference to a "color", a "color of light" or a "frequency of light", whether a generic reference to "color" or a reference to a specific color (such a blue, red, yellow, etc.), may refer not just to a single frequency. Instead, such a reference to a first color or a first frequency may refer to a band of frequencies which is suitably narrow to be distinguished (for example via optical filters) from a second color at a second band of frequencies. So for example, "red" may refer to a range of frequencies (approximately 405 THz to 480 THz) which are associated with the color red as perceived by humans, and which can be distinguished from other colors such as blue (approximately 610 to 665 THz) or yellow (approximately 510 to 540 THz), etc.

A color may refer to the entire range of frequencies conventionally ascribed to a particular color, or to one or more subsets of that range, with the understanding that a particular frequency range selected in practice will be suitable for the specified application (such as imaging a 2D symbol). In different embodiments, different frequency ranges within a general frequency range may be employed (e.g., different bands within the "green spectrum"). In practical application a projected frequency of light, or a received frequency of light, may extend marginally into the frequency band of an adjacent color; or a projected light may have multiple frequency bands, but with a specified frequency or frequency band dominating in intensity to an extent that makes the projected light be effectively of the one dominant frequency band.

It is also understood that in practical application, a specified frequency band may overlap the domain of two or even three common colors (e.g., a specified frequency band may comprise adjacent portions of the green and yellow bands).

The term "broadband," as used herein, refers to a light emission which substantially spans full multiple bands of conventional colors, for example from red through green, or yellow through blue, with no one band being substantially dominant in intensity. "Broadband" may also refer to emissions of multiple bands which are non-adjacent, but typically include multiple different conventionally named colors. "Broadband" may also refer to a light emission which is white, that is, spanning substantially all visible colors (red through blue). In general, the terms "frequency band" or "color" may be understood as being substantially narrower in frequency range, and distinguishable from, a broadband emission.

In many cases in this document, specific colors are not specified, and reference is made rather to a first frequency band or second frequency band; it will be understood that in specific embodiments, particular separate colors may be assigned for each band as suitable for the application at hand.

It will also be understood that while reference is mostly made herein to "colors", "frequencies or light", or "frequency bands", such descriptions could as easily be made in terms of wavelengths of light. The choice of "colors" or "frequencies" is for convenience only. In general, "color" or "colors", and "frequency" or "frequencies", are employed interchangeably in this document.

Listed here for example only, and without limitation, are some of the frequency ranges which may be conventionally assigned to various visible colors:

red: approx. 405 to 480 THz or 700 to 625 nm;
orange: approx. 480 to 510 THz or 625 to 590 nm;
amber: variously assigned at the border of orange and yellow, but typically centered at approx. 504 THz or 595 nm;
yellow: approx. 510 to 540 THz or 590 to 560 nm;
green: approx. 540 to 580 THz or 560 to 520 nm;
cyan: approx. 580 to 610 THz or 520 to 495 nm;
blue: approx. 610 to 665 THz or 495 to 450 nm;
violet: approx. 665 to 790 THz or 450 to 380 nm.

Persons skilled in the art will recognize that specific dividing frequencies or dividing wavelengths between common colors are necessarily somewhat arbitrary, and may vary slightly in descriptions from different sources.

Symbol Reader

The present system and method embraces devices designed to read machine-readable symbols.

In an exemplary embodiment, such a device may be a hand-held scanner. FIG. 1 is a perspective view of an exemplary hand-held symbol reader 100 acquiring data from a machine-readable symbol 102.

The machine-readable symbol 102 is affixed to a package 104 or the like such that the user points the hand-held symbol reader 100 towards the machine-readable symbol 102, generally using an aiming beam 116 to guide in aiming.

The symbol reader 100 may be a line scanner operable to emit and sweep a narrow beam of electromagnetic energy 118 across a field-of-view 106 over two-dimensional (2D) machine-readable symbol 102. In other embodiments, an aperture means, mirror, lens or the like is adjusted to sweep across a symbol line to receive returning electromagnetic energy from a relatively small portion (e.g., cell) of the machine-readable symbol, which is detected by an optical detector system.

In yet other embodiments, a 2D array symbol reader 100 acquires a captured image of the machine-readable symbol 102 (and a suitable region of quiet area around the machine-readable symbol). For the present system and method, the acquisition of a captured image of the symbol may be a preferred method of operation for the symbol reader 100. Suitable image processing hardware 235 and software running on processors 242, 244 (see FIG. 2 below) are used to deconstruct the captured image to determine the data bits represented by the cells.

The machine-readable symbol reader 100 is illustrated as having a housing 108, a display 110, a keypad 112, and an actuator device 114. Actuator device 114 may be a trigger, button, or other suitable actuator operable by the user to initiate the symbol reading process.

The machine-readable symbol 102 shown in the figure is intended to be generic and, thus, is illustrative of the various types and formats of machine-readable symbols. For example, some machine-readable symbols may consist of a single row of codewords (e.g., barcode). Other types of machine-readable symbols (e.g., matrix or area code) may be configured in other shapes, such as circles, hexagons, rectangles, squares and the like. It is intended that many various types and formats of machine-readable symbologies be included within the scope of the present system and method.

Symbol Reader Internal Block Diagram

Figure 2:
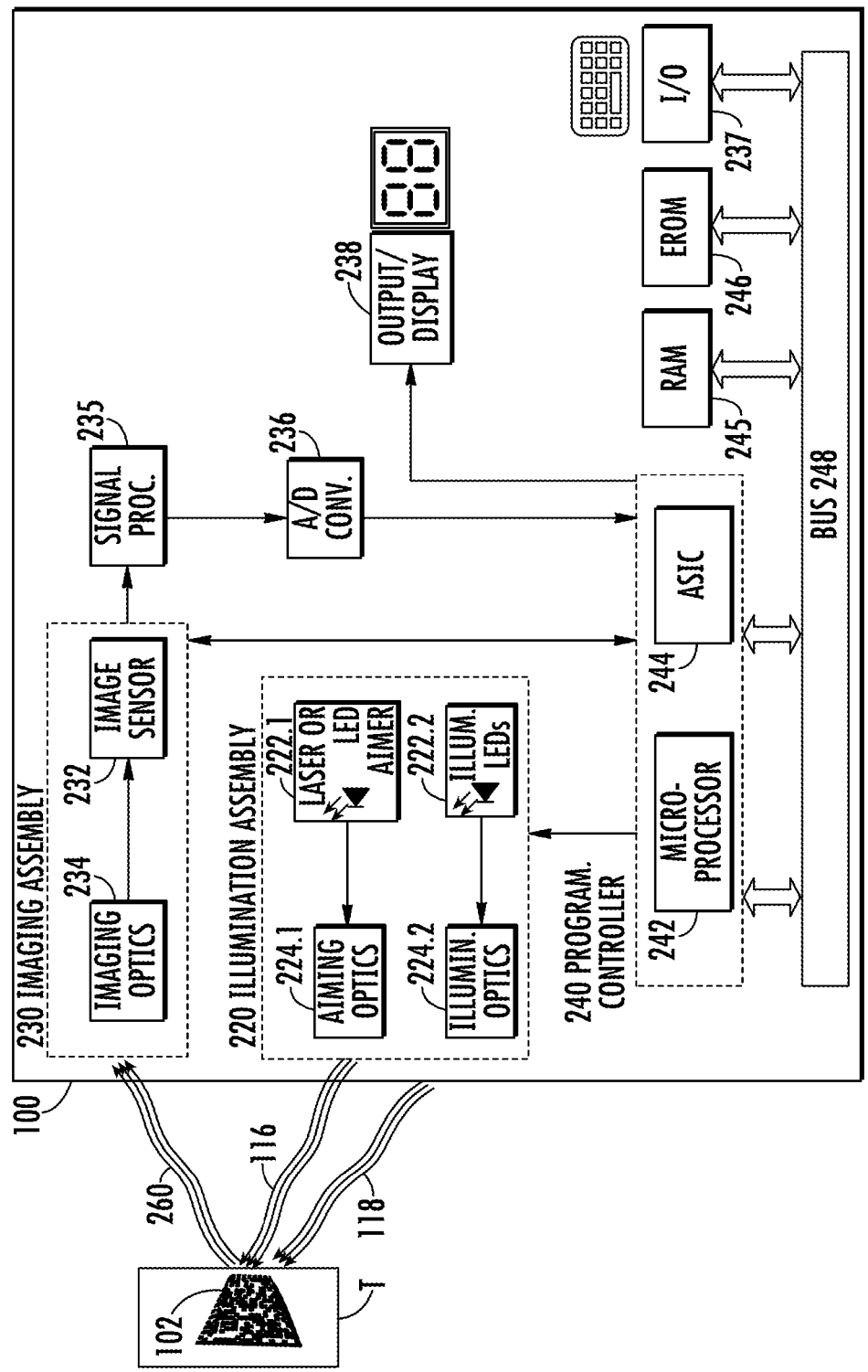
FIG. 2 is an internal block diagram of an exemplary symbol reader for acquiring data from a machine-readable symbol.

FIG. 2. shows an internal block diagram of an exemplary symbol reader 100, which includes elements which may be present in a scanner to support the present system and method.

In one embodiment of the present system and method, the symbol reader 100 may be an optical reader. Optical reader 100 may include an illumination assembly 220 for illuminating a target object T, which has attached or impressed on it a 1D or 2D bar code symbol 102. Optical reader 100 may also include an imaging assembly 230 for receiving an image of object T and generating an electrical output signal indicative of the data which is optically encoded therein.

Illumination assembly 220 may, for example, include one or more illumination source assemblies 222, such as one or more LEDs. Illumination assembly 220 may also include one or more associated illuminating optics and/or aiming optics assemblies 224 for directing illumination light 118 from light source(s) 222 in the direction of target object T. Optics assemblies 224 may include mirrors, rotating mirrors, lenses, or other light focusing or light directing elements (not shown). Two optics assemblies (224.1, 224.2) are illustrated in FIG. 2, but in application a common or integrated optics assembly 224 may be used to focus both aimer light 116 and illumination light 118.

In an embodiment, a first separate light (laser or LED) 222.1 is used to produce the aimer light 116, while a second separate illumination light (typically LED, but may be laser) 222.2 is used to produce reading light 118 to support reading of the symbol 102 by imaging assembly 230. In an alternative embodiment, Aimer LEDs/Laser 222.1 and Illumination LEDs 222.2 may be combined into a single illumination element.

In an embodiment, separate aiming optics 224.1 and illumination optics 224.2 are provided for. In an alternative embodiment, a single optics element or set of optics elements may provide focusing for both aiming and illumination.

Imaging assembly 230 receives reflected light 260 which is reflected from symbol 102. Reflected light 260 may include spectral components of aimer light 116, illumination light 118, or both. In an embodiment, imaging assembly 230 may include an image sensor 232, such as a 2D CCD or CMOS solid state image sensor, together with an imaging optics assembly 234 for receiving and focusing an image of object T onto image sensor 232. The field of view of the imaging assembly 230 will depend on the application. In general, the field of view should be large enough so that the imaging assembly can capture a bit map representation of a scene including an image data reading region at close reading range.

In an embodiment of the present system and method, exemplary symbol reader 100 of FIG. 2 also includes programmable controller 240 which may comprise an integrated circuit microprocessor 242 and an application specific integrated circuit (ASIC) 244. Processor 242 and ASIC 244 are both programmable control devices which are able to receive, output and process data in accordance with a stored program stored in either or both of a read/write random access memory (RAM) 245 and an erasable read only memory (EROM) 246. Processor 242 and ASIC 244 are also both connected to a common bus 248 through which program data and working data, including address data, may be received and transmitted in either direction to any circuitry that is also connected thereto. Processor 242 and ASIC 244 may differ from one another, however, in how they are made and how they are used.

In one embodiment, processor 242 may be a general purpose, off-the-shelf VLSI integrated circuit microprocessor which has overall control of the circuitry of FIG. 2, but which devotes most of its time to decoding image data stored in RAM 245 in accordance with program data stored in EROM 246. Processor 244, on the other hand, may be a special purpose VLSI integrated circuit, such as a programmable logic or gate array, which is programmed to devote its time to functions other than decoding image data, and thereby relieve processor 242 from the burden of performing these functions.

In an alternative embodiment, special purpose ASIC 244 may be eliminated entirely if general purpose processor 242 is fast enough and powerful enough to perform all of the functions contemplated by the present system and method. It will, therefore, be understood that neither the number of processors used, nor the division of labor there between, is of any fundamental significance for purposes of the present system and method.

In an embodiment, exemplary symbol reader 100 includes a signal processor 235 and an analog-to-digital (A/D) chip 236. These chips together take the raw data from image sensor 232 and convert the data to digital format, which in an exemplary embodiment may be a digital format conveying specific colors or color bandwidths, for further processing by programmable controller 240.

In an embodiment, the system and method of the present invention employs algorithms stored in EROM 246 which enable the programmable controller 240 to analyze the image data from signal processor 235 and A/D 236. In an embodiment, and as described further below, this image analysis may include analyzing color or frequency information (levels of different frequency bands) in the image data. In an embodiment, and in part based on the color analysis, programmable controller 240 may then implement an improved system and method to distinguish a first color provided by the aimer 222.1 (or by an aimer filter 320.1, see FIG. 3) from a second color provided by the illuminator 222.2 (or by an illuminator filter 320.2, see FIG. 3).

Exemplary symbol reader 100 may also include input/output (I/O) circuitry 237, for example to support the use of the keyboard 112 and trigger 114. Symbol reader 100 may also include output/display circuitry 238 to support display 110.

Exemplary Symbol Reader with Color Distinction Between Aimer and Illuminator, and Color Selective Image Sensor In a conventional symbol reader 100 the light sources 222—for example, Aimer LED 222.1 and Illumination LED 222.2—whether actually two physical elements or just one physical element, may employ: (i) a common color or frequency of light, or (ii) two similar colors or frequencies (for example, partially overlapping bands) with no separate between the two spectral bands. This may result in interference problems between aimer light 116 projected for aiming the reader 100 and illumination light 118 projected for purposes of optically obtaining the symbol 102. Prior art symbol readers have resolved these interference problems in ways described above in this document, which result in various performance compromises.

The present system and method introduces the use of using at least two different colors, or equivalently, at least two different frequency bands, with at least one such band designated for aimer light 116 and another such band designated for illumination light 118. It will be understood that at least two of the different frequency bands employed respectively for aiming and image acquisition will be substantially non-overlapping. Preferred color frequencies may vary in different embodiments.

A first exemplary embodiment of the present system and method may employ a monochromatic image sensor 232, a blue aimer LED 222.1, and a so-called "white" illumination LED 222.2 which projects principally in the blue and yellow portions of the spectrum. This combination can be effective to discriminate the imaging light 118 from the aimer light 116, because the monochromatic image sensor 232 may have a relatively weak response to the blue frequencies. As a result, the yellow frequencies in the imaging light 118 will dominate in terms affect on the imaging sensor 232, and therefore on imaging the symbol 102; while the blue light (whether from the aimer LED 222.1 or the illumination LED 222.2) will introduce relatively little interference in the imaging process.

A second exemplary embodiment of the present system and method may employ the monochromatic image sensor 232, a blue aimer LED 222.1, and a red or amber (approx. 504 THz or 595 nm) illumination LED 222.2. This combination may avoid the need for a color filter 330 in the imaging assembly 230 (see FIG. 3 below).

A third exemplary embodiment of the present system and method may employ a color image sensor 232, an amber or cyan aimer LED 222.1, and a broadband illumination LED 222.2 or an illumination LED 222.2 with significant spectral intensity in colors other than amber or cyan. This combination can be effective to discriminate the imaging light 118 from the aimer light 116, because the color image sensor 232 may have a relatively weak response to the frequencies associated with amber or cyan.

A fourth exemplary embodiment of the present system and method employs software color filtering. Such an embodiment may use a first designated color for the aimer LED 222.1; at least one second designated color (in a different band from the first) for the illumination LED 222.2; and software image/color processing to remove first designated color (the aimer color) from the signal created by the imaging assembly 230.

This fourth exemplary embodiment may entail the stages of: (i) converting the analog image signal from the imaging assembly 230 to digital form; (ii) performing a Fourier analysis or similar analysis on the digitized signal to identify specific frequency elements; and (iii) removing the frequency elements associated with first designated color.

Possible costs of the fourth exemplary embodiment (the software color-filter approach) may include: (i) some degradation to the image quality, which may reduce decode performance; (ii) color image filtering may increase the decode time; and (iii) a more expensive hardware processor 240 may be required. Some possible advantages of the software filter approach are discussed further below in this document.

The above embodiments are exemplary only. Other combinations of a first color or colors to be projected by the LED aimer 222.1, a second spectrally distinct color or colors to be projected by the illumination LEDs 222.2, and other possible spectral responses by the image sensor 232, may all be envisioned within the scope and spirit of the present system and method, as recited in the appended claims.

In various embodiments of the present system and method, the aimer spectrum and the illumination spectrum have at least one common color or one common spectral band, along with whatever color or colors are distinct between the two. In an alternative embodiment, the aimer color(s) and the illumination color(s) are substantially distinct from each other, that is, they have no substantial spectral overlap.

Exemplary Symbol Reader with One or More Color Filters

Figure 3:
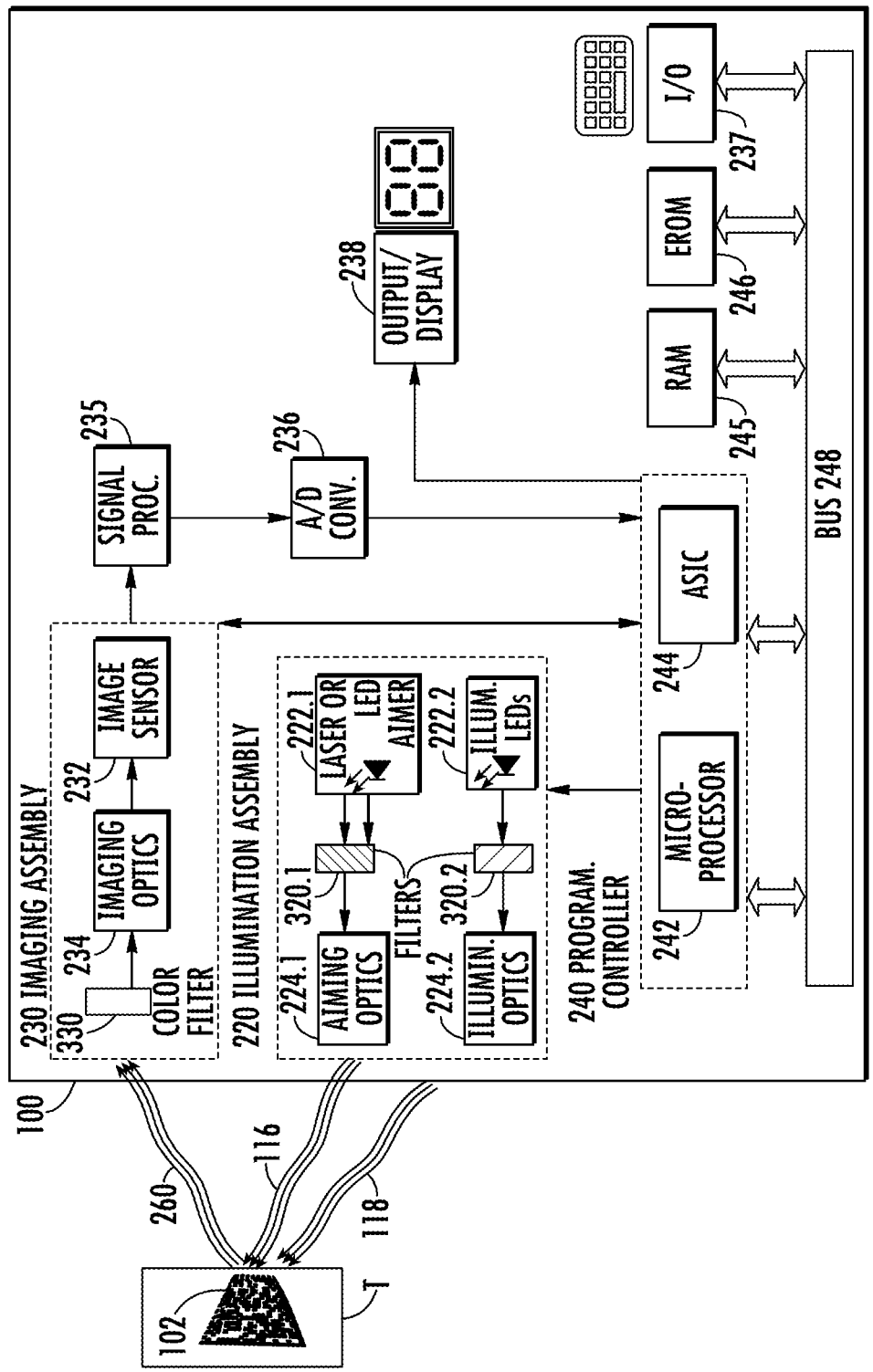
FIG. 3 is an internal block diagram of an exemplary symbol reader for acquiring data from a machine-readable symbol.

FIG. 3. shows an internal block diagram of an exemplary symbol reader 100, similar to the exemplary symbol reader 100 of FIG. 2 above, but with additional elements. For many of the elements which are in common between the two exemplary symbol readers (for example, hardware processors 242/244, memory 245/246, bus 248, and others), a description is not repeated below, and may be presumed to be substantially the same as the descriptions provide in conjunction with FIG. 2 above.

In the exemplary symbol reader 100 of FIG. 3, optical filters 330, 320.1, and 320.2 are elements of the imaging assembly 230 or the illumination assembly 220. The filters 320/330 may be made from a variety of materials known in the art (for example, glass, resin plastics, polyester and polycarbonate), and which may for example be dyed to let certain color or bandwidths of light pass through while blocking others. Optical filters may also be known as "photographic filters." Optical filters may be dyed or may be coated to achieve filtering, and multiple frequencies may be filtered by a single filtering element (for example, with coats of multiple different filtering materials).

In the figure, filters 320/330 are shown as elements separate and apart from optics 224/234, and also separate and apart from image sensor 232 and LEDs/laser 222. In an embodiment, some or all of optical filters 320/330 may be structurally separate from these other components 224/234/222/232.

However, persons skilled in the art will recognize that this schematic distinction is for purposes of illustration, and is not limiting. In an alternative embodiment, for example, imaging color filter 330 may be integrated with either of imaging optics 234 or image sensor 232. For example, imaging optics 234 may comprise a lens or lenses which only pass specified frequency bands, or may comprise a mirror or mirrors which only reflect the specified frequency bands, so that imaging optics 234 and imaging color filter 330 are structurally one element.

In an alternative embodiment, for example, aimer color filter 320.1 associated with aiming light 116 may be integrated with either of aiming optics 224.1 or LED aimer 222.1. For example, aiming optics 224.1 may comprise a lens or lenses which only pass specified frequency bands, or may comprise a mirror or mirrors which only reflect the specified frequency bands, so that aiming optics 224.1 and aiming color filter 320.1 are structurally one element. In an alternative embodiment, LED aimer 222.1 may have an integral color filtering element or may be configured to as to only generate a single frequency band, which may limit the color emitted by LED aimer 222.1 to the specified frequency band.

Substantially similar considerations apply to illumination color filter 320.2 associated with illumination optics 224.2 and illumination LEDs 222.2.

It will further be understood by persons skilled in the art that the positions or spatial ordering of the elements shown are for illustration only, and in various embodiments may be altered while achieving substantially the same filtering, optical, illumination, and image capture effects. For example, in the embodiment illustration in FIG. 3, imaging color filter 330 is illustrated as receiving reflected light from symbol 102, which is then partially transmitted (due to the filtering) to imaging optics 234. In an alternative embodiment with alternative structural ordering, the light reflected by symbol 102 may first be received and focused by imaging optics 234, and then filtered by imaging color filter 330.

Similar considerations apply to aiming light and illumination light. For example, in the embodiment illustrated in FIG. 3, light from illumination LEDs 222.2 is first filtered to specified bandwidths by illumination color filter 320.2, and the filtered light is then focused onto symbol 102 by illumination optics 224.2. In an alternative embodiment with an alternative structural ordering of the components, light from illumination LEDs 222.2 is first focused by illumination optics 224.2, and then filtered by illumination color filter 320.2.

Color filters 320.1, 320.2, and 330 generally serve to achieve the illumination and image capture process discussed above, wherein at least a first frequency band is used for purposes of aiming the scanner 100, and at least one distinct second frequency band is used for illuminating the symbol 102 for image capture.

As will be understood by persons skilled in the art, all, some, or none of the filters shown may be necessary to implement the present system and method.

Nomenclature—Filters and Cut-Filters.

Conventionally, filters are often named for the colors which they allow to pass through, and may also be referred to as "bandpass filters". For example, a blue filter may allow the color blue to pass through, while substantially blocking all other colors. As a result, to the eye the filter generally looks "bluish." Similarly, a red filter may allow wavelengths associated with the color red to pass through, making the filter appear "reddish." A "cut-filter" or a "blocking filter" is a filter which blocks an indicated frequency or color. For example, a "blue-IR cut filter" or "blue blocking filter" blocks frequencies associated with blue (and with infrared), while substantially allowing other frequencies to pass through.

In general in this document, a reference to a blue filter refers to a blue bandpass filter (which lets blue pass through, and so "colors" a white light as blue), a reference to an amber filter refers to an amber bandpass filter which colors white light amber. Where a cut-filter is specifically applicable, it will generally be stated as much in the document, though in some cases the use of a cut-filter may be apparent from context and element usage even when not so stated.

In one exemplary embodiment of the present system and method, the symbol reader 100 may employ a monochrome or color image sensor 232; a blue laser aimer 222.1 or blue LED aimer 222.1, or alternatively a blue aimer color bandpass filter 320.1; and a blue-infrared (IR)-cut filter for both the illumination filter 320.2 and the imaging color filter 330 (and thereby removing the color blue from the illumination light 118). The combination results in an imaging process which excludes the aimer frequency band (blue) from the imaging process.

In an alternative exemplary embodiment employing three filters, laser/LED aimer 222.1 and illumination LEDs 222.2 may both be emitters of broadband light. In such an embodiment, aiming color filter 320.1 may be used to filter the light from LED aimer 222.1 to allow passage of a first frequency band while blocking a second emitted frequency band (which is different from the first); while illumination color filter 320.2 may be used to filter the light from illumination LEDs 222.2 to allow passage of the second frequency band.

Imaging color filter 330, associated with imaging sensor 232, may also be configured to filter received light. Imaging color filter 330 may filter out (remove) the first frequency band which is passed by aimer color filter 320.1 (thereby filtering out the aimer light); while allowing passage of the second frequency which is passed by illumination color filter 320.2 (thereby allowing image sensor 232 to receive the reflected illumination light).

In an alternative embodiment employing two filters, laser/LED aimer 222.1 may emit broadband light but have an aimer color filter 320.1 configured to pass only a first frequency of light (for example, blue), while illumination LEDs 222.2 may emit broadband light and have no associated color filter (so illumination filter 320.2 is not employed). Imaging color filter 330, associated with imaging sensor 232, may also be configured to filter received light. Imaging color filter 330 may filter out (remove) the first frequency band which is passed by aimer color filter 320.1 (thereby filtering out the aimer light); while allowing passage of the remaining broadband frequencies (thereby allowing image sensor 232 to receive all the reflected illumination light, except for the reflected light in the frequency band of the LED aimer 222.1).

In an alternative embodiment employing two filters, laser/LED aimer 222.1 and illumination LEDs 222.2 may have respective color filters 320.1 and 320.2, each configured to allow passage of distinct frequency bands (for example, blue or red for the aimer, but yellow for the illumination light). Image sensor 232 may be a charge-coupled device which is only or principally sensitive to yellow light, and therefore is sensitive mainly to the illumination light only, without requiring imaging color filter 330.

In an alternative embodiment, more than three filters may be employed as well, for example, for purposes of signaling. For example, illumination LEDs 222.2 may have an associated illumination color filter 320.2, which is configured to pass only a first frequency band (red, for example). Image sensor 232 may have an imaging color filter 330 which is configured to pass only the same first frequency band (red, in this case). Laser or LED aimer 222.1 may be a broadband emitter, but with multiple aimer color filters 320.1; different colors, such as blue, green, orange, and violet may then be employed to signal different statuses of scanner 100. In an alternative embodiment, instead of or along with aimer color filter 320.1, scanner 100 may employ multiple aimer LEDs 222.1 which emit different colors of light (a blue LED, a green LED, an orange LED, etc.).

The above combinations of filters are exemplary only. It will be understood by persons skilled in the art that other combinations of filters may be employed as well within the scope and spirit of the present system and method, as recited in the appended claims.

Exemplary Structural Arrangement

Figure 4:
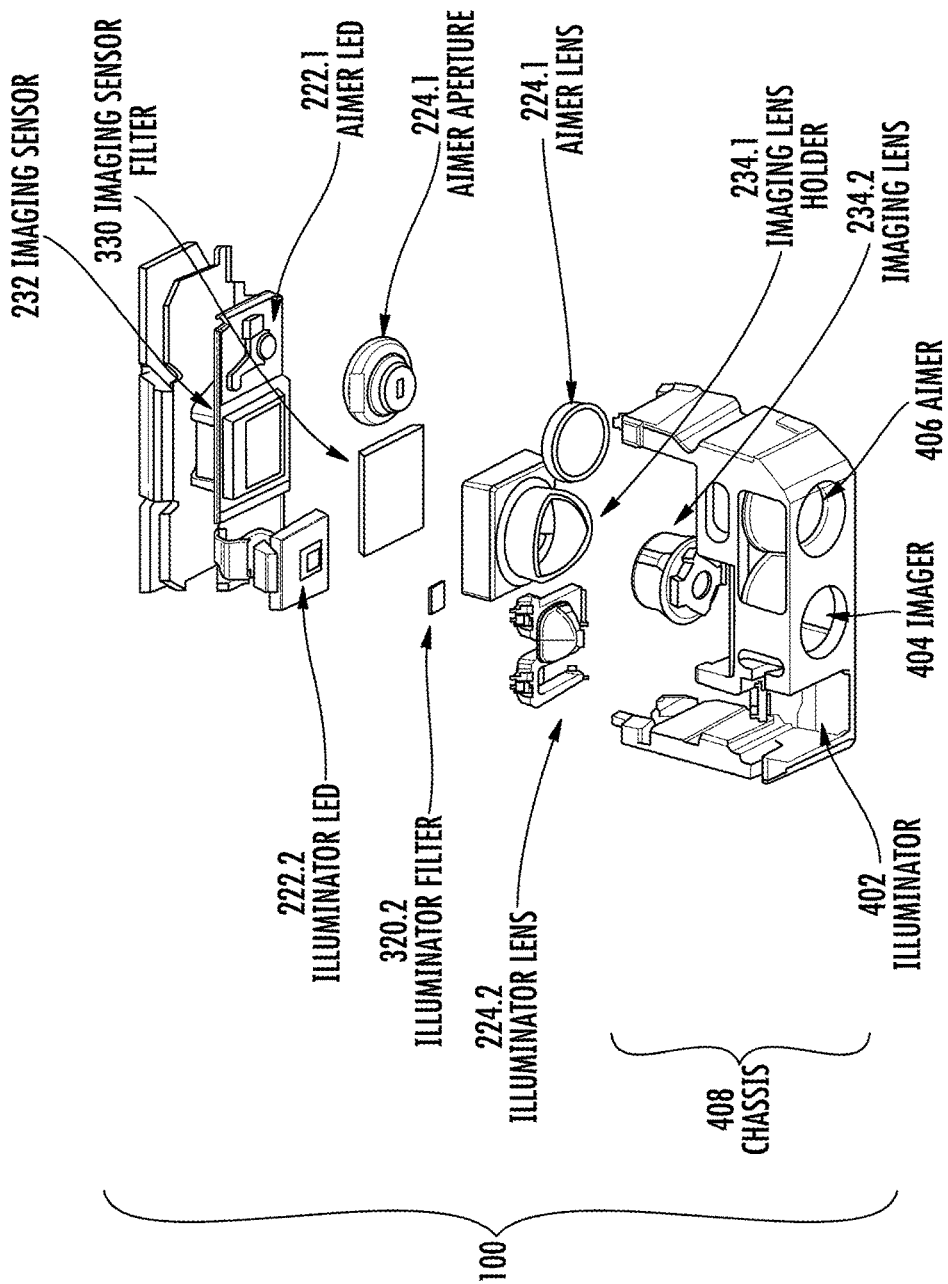
FIG. 4 is an exploded view of internal structural components of an exemplary symbol reader for acquiring data from a machine-readable symbol.

FIG. 4. shows an exploded structural/component view of an exemplary symbol reader 100 according to the present system and method. The relevant component parts are arranged as they might be in an exemplary symbol reader. Labeled in the figure are those elements which are part of imaging assembly 230 and illumination assembly 220. Persons skilled in the art will understand that an operational reader 100 will include other components not shown in the figure, such as processors (242, 244), memory (245, 246), I/O control chips 237, other electronic components (235, 236), power supply elements, circuit boards, etc.

Symbol reader 100 includes image sensor 232, imaging color filter 330, and an imaging lens holder 234.1 and imaging lens 234.2, both elements of imaging optics 234.

Symbol reader 100 also includes illuminator LED 222.2, illuminator color filter 320.2, and illuminator optics/lens 224.2.

Symbol reader 100 also includes aimer LED 222.1, and an aimer aperture 224.1 and aimer lens 224.2, both elements of aiming optics 224.1.

It will be noted that in the embodiment shown the aimer elements do not include a distinct, identifiable aimer color filter 320.1. In one embodiment, and as discussed above, symbol reader 100 may not require an aimer color filter 320.1. In an embodiment, aimer LED 222.1 may be configured to emit light only a limited band or specific color range, eliminating the need for aimer color filter 320.1. In an alternative embodiment, color filtering may be performed by aimer lens 224.1. In an alternative embodiment, a distinct aimer color filter 320.1 (not shown in FIG. 4) may be included at any of several points in the optical path of the aiming elements. In an alternative embodiment, symbol reader 100 may have multiple aimer color filters 320.1, which may be employed for such purposes as signaling a user via different aiming colors.

In an embodiment, aimer aperture 224.1 may be configured to be adjustable, so as to display various graphic images for purposes of user-signaling and instruction. In an alternative embodiment, symbol reader 100 may employ multiple aimer LEDs 222.1, possibly of different colors, to enable or to contribute to signaling via the aimer light.

Symbol reader 100 of FIG. 4 is exemplary only. As noted above, not all elements may be included in all embodiments. For example, the use of different color filters and/or the presence of different color filters 320.1/320.2/330 may vary in different embodiments, with not all filters necessarily being present in all embodiments.

Symbol reader 100 also includes a chassis 408 which holds other components in place and provides an exterior surface for the reader 100, for grasping and holding. The chassis 408 includes forward-placed openings or receptacles configured to provide paths for light coming out of, and going into, the reader 100; as well as for holding and mounting forward optical components. Illuminator receptacle 402 is configured to mount illuminator lens 224.2; imager receptacle 404 is configured to mount imaging lens 234.2 (and possibly imaging lens holder 234.1); aimer receptacle 406 is configured to mount aimer lens 224.1. Chassis 408 may also provides interior mounting receptacles for the other electronic components enumerated above, but not shown in the figure.

Illumination and Filter Options

Figure 5:
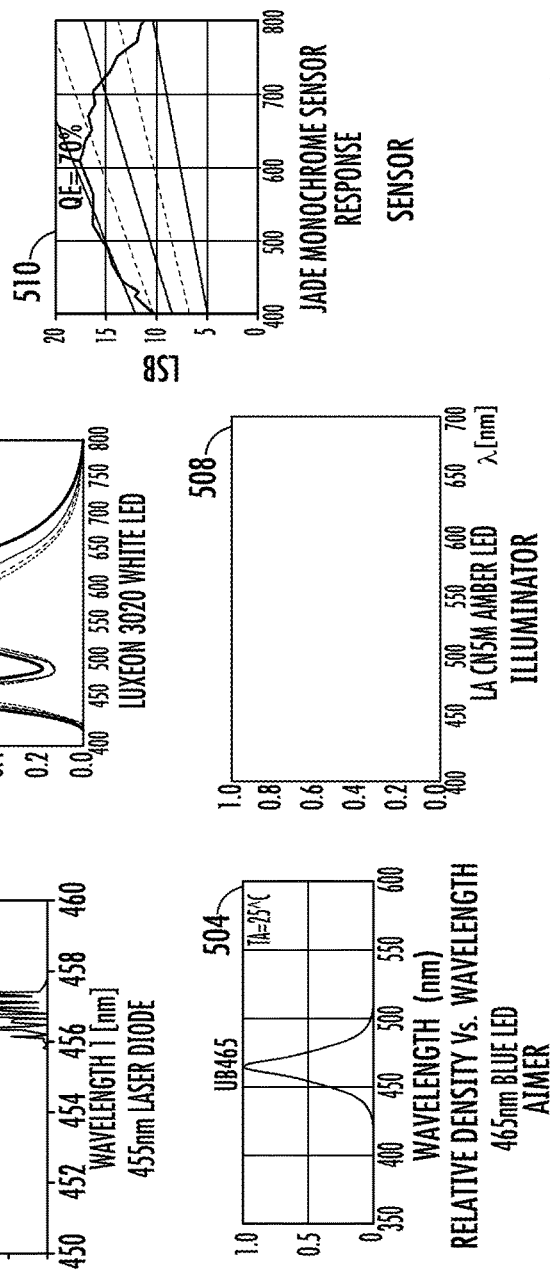
FIG. 5 illustrates spectrum properties of several exemplary lights sources which may be employed in conjunction with an exemplary symbol reader for acquiring data from a machine-readable symbol.

Illumination:

FIG. 5 provides spectrum plots 502/504/506/508/510 for a variety of scanner light sources 222/232 which may be employed in conjunction with the present system and method, and specifically with an exemplary symbol reader 100 employing a blue aimer source 222.1 and an illuminator/reading-light source 222.2 which is white or red/amber.

In an embodiment, such an exemplary scanner may employ for the aimer LED 222.1, for example, a blue/violet LED emitting in wavelengths from 456 to 458 nm (502); or in an alternative embodiment, a blue/violet Laser diode emitting in wavelengths from approximately 435 nm to 500 nm, with a peak center wavelength of about 465 nm (504). In an alternative embodiment, such wavelengths may also be generated, in whole or part, by a combination of an aimer light source 222.1 and a suitable aimer color filter 320.1.

In an embodiment, such an exemplary scanner may employ for the illumination/reading LED 222.2, for example, a broad spectrum white LED with two or more wavelength peaks (506); or in an alternative embodiment a red/amber LED with a peak wavelength of about 625 nm (508). In an alternative embodiment, such wavelengths may also be generated, in whole or part, by a combination of an illuminator light source 222.2 and a suitable illuminator color filter 320.2.

In an embodiment, such an exemplary scanner may employ for the image sensor 232 a charge-coupled device or similar sensing element with a substantially broadband, frequency-insensitive (i.e., monochrome) spectral response (510).

Figure 6:
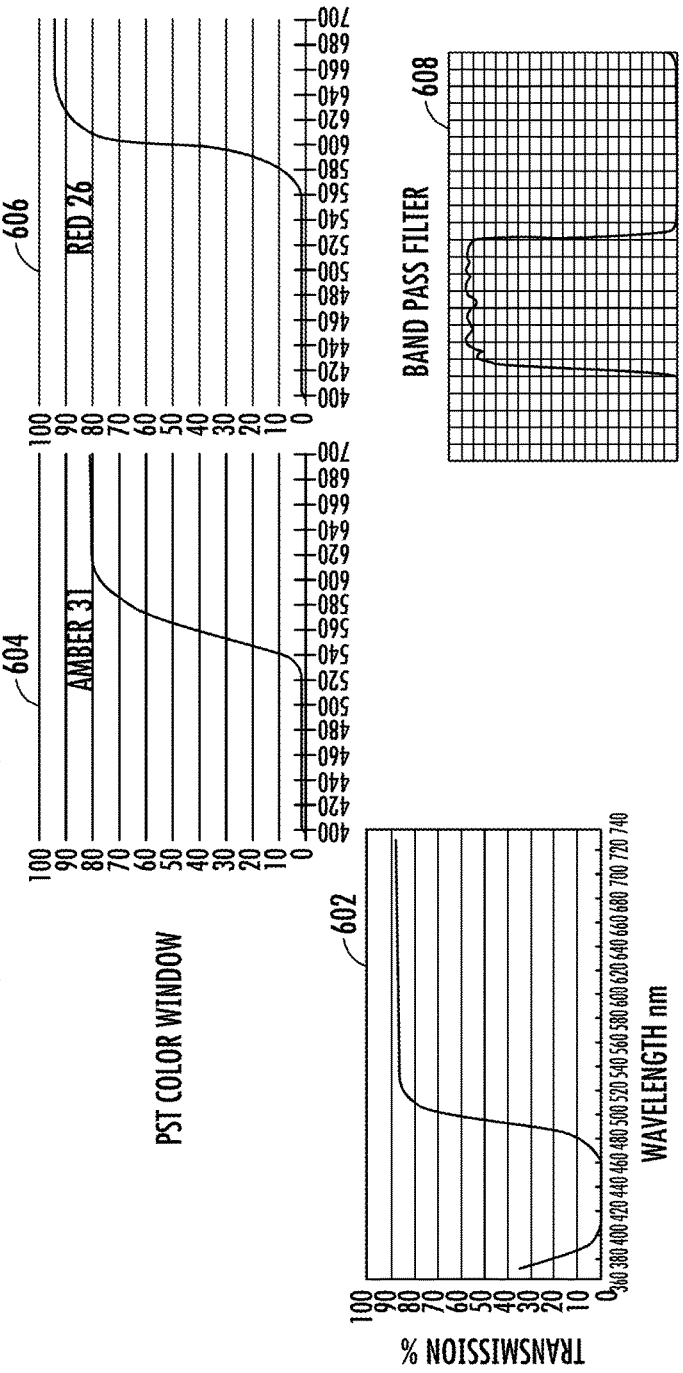
FIG. 6 illustrates spectrum properties of several exemplary optical filters which may be employed in conjunction with an exemplary symbol reader for acquiring data from a machine-readable symbol.

Optical Filters:

FIG. 6 provides spectrum plots 602/604/606/608 for a variety of optical color filters 320/330 which may be employed in conjunction with an exemplary symbol reader 100 according to the present system and method.

In an embodiment, an exemplary scanner 100 may employ for the image sensor color filter 330 an amber band-pass filter (604), which would block aimer illumination 116 from a blue aimer 222.1 while still allowing the reading light 118 from a white illuminator 222.2.

In an alternative embodiment, an exemplary scanner 100 may employ for the image sensor color filter 330 a red band-pass filter (606), which would block aimer illumination 116 from a green aimer 222.1 while passing the reading light 118 from a red illuminator 222.2.

In an alternative embodiment, an exemplary scanner 100 may employ for the image sensor color filter 330 a yellow band-pass filter (602), which would block aimer illumination 116 from a blue aimer 222.1, and also block the blue portion of reading light 118 from a white LED illuminator 222.2; but would still pass other frequencies of reading light from the white LED illuminator 222.2.

In an alternative embodiment, an exemplary scanner 100 may employ for the image sensor color filter 330 a custom band-pass filter (602), which would block aimer illumination 116 from reaching the image sensor 232; but would still pass other frequencies of reading light from the white LED illuminator 222.2 through to the image sensor 232.

Light Band and Filter Design Optimization

In application of the present system and method, persons skilled in the art will appreciate that it is desirable to optimize the selection of light bands 116, 118—and the concomitant choice of filters 320—with a view towards optimizing performance of a scanner 100. A variety of considerations and factors may come into play for optimization. These include, for example and without limitation:

(1) Human Eye Response and Perception:

The color for the aimer light 116, and associated filter 320.1 selection (if a filter is used) may be selected with a view towards providing the best contrast for the aimer, to aid the user with readily aiming the scanner 100 with minimal eye strain.

(2) Signal-to-Noise Ratio Optimization:

Both the aimer light 116 and illumination light 118 may be selected with a view towards achieving the best signal-to-noise ratio for the image sensor 232. In practice, this may entail selecting an aimer light 116 which is as spectrally remote as possible from the frequencies in which the image sensor 232 is most responsive.

(3) Ambient-Light Contribution:

In real-world application, ambient light will contribute to the image signal. Ambient light typically includes natural day light, artificial indoor lightings, and combinations thereof. The light band selection 116, 118 and filter 320 design may be optimized based on the statistics of these contributions, to achieve the best aimer visibility and image sensitivity.

Application of Software-Based Color Filtering:

In real-world usage of the scanner 100, ambient lighting conditions may vary. As result, dynamic discriminations of light bands for aiming and detection may result in optimum scanner performance in varied environments. The software color-filtering approach has already been discussed above. Software filtering can have the advantage of providing real-time optimization of the image sensor 232 detection criteria, to achieve the best separation between aimer light 116 and wanted-image lighting under various application environments. With scene analysis and spectral analysis, the unwanted aimer pattern can be isolated out from the image.

Exemplary Method

Figure 7:
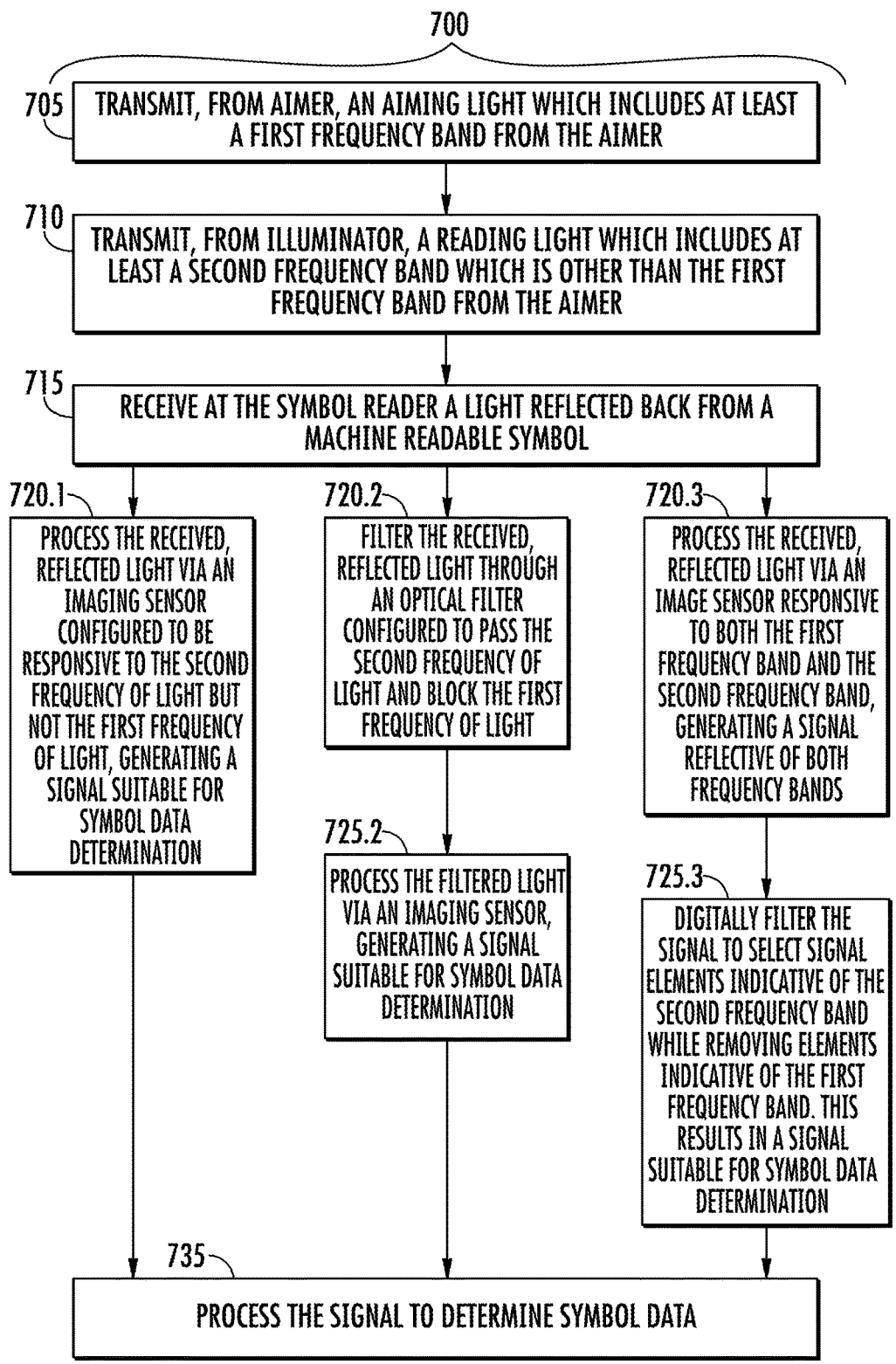
FIG. 7 is a flow-chart of an exemplary method, performed by an exemplary symbol reader, for aiming the symbol reader and reading a symbol via the symbol reader using at least two distinct frequency bands of light.

FIG. 7 presents a flow chart of an exemplary method for reading a machine-readable symbol 102 by an exemplary symbol reader 100. The method may branch into alternative paths, depending on a particular hardware and/or software configuration of the exemplary scanner 100.

The method begins with either or both of steps 705 and 710, which in an embodiment may be performed in the order shown; in an alternative embodiment may be performed in a reverse order (that is, step 710 before step 705); and in an alternative embodiment, performed simultaneously.

In step 705 the reader 100 transmits from an aimer 222.1 and possibly an associated color filter 320.1, an aiming light 116 which includes at least a first frequency band of light, but which excludes (or substantially minimizes) at least one second frequency band of light which is other than the first frequency band.

In step 710 the reader 100 transmits from an illuminator 222.2 and possibly an associated color filter 320.2, a reading light 118 which includes at least the second frequency band which is other than the first frequency band from the aimer 222.1.

In step 715 the symbol reader receives a light reflected back from a machine-readable symbol.

In a first embodiment, the symbol reader has an imaging sensor 232 configured to be responsive to the second frequency of light but not the first frequency of light. Continuing from step 715, in step 720.1 the image sensor 232 so configured generates an electrical signal representative of the second frequency of light and suitable for symbol data determination. In step 735, the symbol reader 100 determines, from the electrical signal, the symbol data.

In an alternative second embodiment, the symbol reader has an imaging sensor 232 which may be responsive to both the first frequency of light and the second frequency of light. Continuing from step 715, in step 720.2 the reflected, received light is processed through an optical filter configured to pass the second frequency of light and to block the first frequency of light. In step 725.2, the filtered light is received by the image sensor 232, which then generates an electrical signal representative of the second frequency of light and suitable for symbol data determination. In step 735, the symbol reader 100 determines, from the electrical signal, the symbol data.

In an alternative third embodiment, the symbol reader has an imaging sensor 232 which may be responsive to both the first frequency of light and the second frequency of light. Continuing from step 715, in step 720.3 the image sensor generates an electrical signal responsive to both the first frequency band and the second frequency band, generating an electrical signal reflective of both frequency bands. In step 725.3, symbol reader 100 digitally filters the electrical signal to select signal elements indicative of the second frequency band, while removing elements indicative of the first frequency band. In step 735, the symbol reader 100 determines, from the electrical signal, the symbol data.

Summary

An exemplary symbol reader 100 employs at least two separate colors or frequency bands to illuminate a machine-readable symbol. The first frequency band is used to illuminate the symbol in order to assistant with aiming the reader. The second frequency is used to provide illumination for actually reading the symbol. By employing two separate frequency bands, it is possible to aim the symbol reader 100, and read the machine-readable symbol 102, engaging in both operations concurrently, without degradation of signal integrity and without lowering the reliability of the symbol reading process.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;

U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;

U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;

U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary data structures, and examples. Insofar as such block diagrams, flow charts, schematics, exemplary data structures, and examples contain one or more functions and/or operations, it will be understood by those skilled in the art that each function and/or operation within such block diagrams, flowcharts, schematics, exemplary data structures, or examples can be implemented, individually and/or collectively, by a wide range of hardware, software, firmware, or virtually any combination thereof.

In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the control mechanisms taught herein are capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined to provide further embodiments. These and other changes can be made to the present systems and methods in light of the above-detailed description. In general, in the following claims, the terms used should not be construed to limit the invention to the specific embodiments disclosed in the specification and the claims, but should be construed to include all machine-readable symbol scanning and processing systems and methods that read in accordance with the claims. Accordingly, the invention is not limited by the disclosure, but instead its scope is to be determined entirely by the following claims.

What is claimed is:

1. A scanner, comprising:
an aimer configured to provide aiming light comprising at least one aiming frequency to support aiming of the scanner at a machine-readable symbol (MRS);
an illuminator configured to provide reading light comprising at least one reading frequency which illuminates the MRS to support optical reading of the MRS; and
an imaging sensor having an optical filter configured to block the at least one aiming frequency and to transmit the at least one reading frequency, the imaging sensor configured to:
receive light reflected by the MRS, and
convert the reflected light to an electrical signal suitable for signal processing by the scanner;
wherein the illuminator comprises an illuminator filter configured to block the at least one aiming frequency.

2. The scanner of claim 1, wherein:
the aimer is configured to provide aiming light which consists essentially of a first frequency;
the illuminator is configured to provide reading light of a second frequency which is different from the first frequency; and
the imaging sensor is configured to be responsive to the second frequency and to not be responsive to the first frequency.

3. The scanner of claim 1, wherein:
the aimer is configured to provide aiming light which consists essentially of a first frequency;
the illuminator is configured to provide reading light of a second frequency which is different from the first frequency;
the optical filter is configured to block the first frequency and to transmit the second frequency; and
the optical filter is configured and arranged to filter along an optical path which conveys the light reflected from the MRS to the imaging sensor.

4. The scanner of claim 1, wherein:
the aimer is configured to provide aiming light which consists essentially of a first frequency;
the illuminator is configured to provide reading light of a second frequency which is different from the first frequency;
the optical filter is configured to block the first frequency and to transmit the second frequency; and
the optical filter is interposed between the image sensor and the MRS.

5. The scanner of claim 1, wherein:
the aimer is configured to provide aiming light which consists essentially of a first frequency;
the illuminator is configured to provide reading light comprising a plurality of frequencies, the plurality of frequencies comprising at least a second frequency which is different from the first frequency; and
the imaging sensor is configured to be responsive to at least the second frequency and to not be responsive to the first frequency.

6. The scanner of claim 1, wherein:
the aimer is configured to provide aiming light which consists essentially of a first frequency;
the illuminator is configured to provide reading light comprising a plurality of frequencies, the plurality of frequencies comprising at least a second frequency which is different from the first frequency;
the optical filter is configured to block the first frequency and to transmit the second frequency; and
the optical filter is configured and arranged to filter along an optical path which conveys the light reflected from the MRS to the imaging sensor.

7. The scanner of claim 1, wherein:
the aimer is configured to emit a first plurality of frequencies;
the at least one reading frequency being a frequency which is not emitted by the aimer; and
the imaging sensor is configured to be responsive to the at least one reading frequency.

8. The scanner of claim 7, wherein the aimer comprises:
an aimer light source which emits the first plurality of frequencies and emits the at least one reading frequency; and
an aimer filter configured to block the at least one reading frequency.

9. The scanner of claim 1, wherein:
the aimer is configured to emit a first plurality of frequencies;
the at least one reading frequency being a frequency which is not emitted by the aimer;
the optical filter is configured to transmit light of the least one reading frequency and block light of the first plurality of frequencies emitted by the aimer.

10. The scanner of claim 1, wherein the aimer is configured to generate a visual indicator of at least one of:
a data of the machine-readable symbol;
an instruction for operation of the electronic scanner;
an electronic scanner function;
an electronic scanner status; and
an electronic scanner activity.

11. The scanner of claim 10, wherein the aimer is configured to generate the visual indicator via at least one of:
an aimer light source which emits a plurality of colors;
a plurality of aimer light sources, each light source of the plurality emitting a different color;
an aimer filter configured to select a color from among a plurality of colors emitted by the aimer; and
an image projector element.

12. The scanner of claim 1, wherein:
the aimer and the illuminator are configurable to be operable simultaneously; and
the imaging sensor is configured to acquire the MRS while the aiming light is being emitted.

13. The scanner of claim 1, wherein the aimer is configured to emit a full-frame light pattern comprising a complete field-of-view of the MRS.

14. The scanner of claim 1, wherein the imaging sensor comprises:
a photosensitive element to convert the received reflected light to an electrical signal; and
a signal processing module configured to remove, from the electrical signal, a signal element representative of the aiming light reflected from the MRS.

15. A scanner, comprising:
an aimer to provide aiming light to support aiming of the scanner at a machine-readable symbol (MRS);
an illuminator to provide reading light which illuminates the MRS to support optical reading of the MRS; and
an imaging sensor comprising a light-to-electricity conversion element and a signal filter module, and configured so that upon receiving light reflected from the MRS:
the light-to-electricity conversion element converts the received light reflected from the MRS to a first electrical signal; and
the signal filter module performs a signal filtering operation to extract, from the first electrical signal, a second electrical signal representative of the received reading light suitable for determining a data content of the MRS by the scanner.

16. The scanner of claim 15, wherein the imaging sensor is configured to distinguish a first light frequency which is present in the reading light and which is not present in the aiming light.

17. The scanner of claim 16, comprising an optical bandpass filter configured to pass the first light frequency and to block a second light frequency.

18. The scanner of claim 15, wherein:
the imaging sensor is configured so that upon receiving light reflected from the MRS the imaging sensor distinguishes, in the received light, aiming light reflected from the MRS from reading light reflected from the MRS.

19. The scanner of claim 18, wherein the signal filtering module is configured to dynamically select, from among a plurality of frequencies of the received reading light, an optimum frequency to convert to the electrical signal suitable for determining the data content of the MRS.

20. The scanner of claim 19, wherein the selection of the optimum frequency is determined based on at least one of:
an ambient light spectrum impinging on the MRS; and
an optical signal-to-noise ratio optimization with respect to the imaging sensor.

* * * * *